United States Patent
Vaderna et al.

(10) Patent No.: US 9,491,285 B2
(45) Date of Patent: Nov. 8, 2016

(54) TECHNIQUE FOR PERFORMANCE MANAGEMENT IN A MOBILE COMMUNICATIONS NETWORK

(71) Applicant: Telefonaktiebolaget L M Ericsson (publ), Stockholm (SE)

(72) Inventors: Peter Vaderna, Budapest (HU); András Rácz, Budapest (HU); Norbert Reider, Tényö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 14/576,350

(22) Filed: Dec. 19, 2014

(65) Prior Publication Data

US 2015/0181022 A1    Jun. 25, 2015

(30) Foreign Application Priority Data

Dec. 19, 2013    (EP) .................................. 13005946

(51) Int. Cl.
*H04W 4/00* (2009.01)
*H04M 3/36* (2006.01)
(Continued)

(52) U.S. Cl.
CPC .............. *H04M 3/36* (2013.01); *H04L 41/142* (2013.01); *H04L 41/5003* (2013.01); *H04L 41/5016* (2013.01); *H04M 3/2263* (2013.01); *H04W 24/10* (2013.01); *H04W 28/18* (2013.01)

(58) Field of Classification Search
CPC ... H04M 3/36; H04M 3/2263; H04L 41/142; H04L 41/5003; H04L 41/5016; H04W 24/10; H04W 28/18
USPC .............................. 455/422.1, 436; 705/7.39
See application file for complete search history.

(56) References Cited

U.S. PATENT DOCUMENTS 6,928,472 B1    8/2005  Wen
8,364,141 B1    1/2013  Kateley et al.
(Continued)

FOREIGN PATENT DOCUMENTS

EP          2584814 A1     4/2013
WO     2011045736 A1     4/2011
(Continued)

OTHER PUBLICATIONS

3GPP, "3rd Generation Partnership Project; Technical Specification Group Services and System Aspects; Telecommunication Management; Performance Management (PM); Concept and requirements (Release 11)", 3GPP TS 32.401 V11.0.0, Sep. 1-29, 2012.

*Primary Examiner* — Amancio Gonzalez
(74) *Attorney, Agent, or Firm* — Murphy, Bilak & Homiller, PLLC

(57) ABSTRACT

A technique of generating statistics for a performance metric of a mobile communications network is presented. The performance metric depends on at least a first parameter and a second parameter, wherein the first and second parameters each can be categorized in two or more non-overlapping sets of parameter values. Different combinations of first and second parameter value sets are defined. A method implementation of the technique comprises receiving performance metric values, first parameter values and second parameter values. A particular performance metric value is associated with the first and second parameter values prevailing when the particular performance metric value was acquired. The method further comprises identifying groups of performance metric values for which the associated first and second parameter values match the first and second parameter value sets of an individual combination, and generating the performance metric statistic from the identified groups of performance metric values.

15 Claims, 10 Drawing Sheets

(51) Int. Cl.
*H04M 3/22* (2006.01)
*H04L 12/24* (2006.01)
*H04W 24/10* (2009.01)
*H04W 28/18* (2009.01)

(56) References Cited

U.S. PATENT DOCUMENTS 9,031,561 B2 * 5/2015 Nuss ............... H04W 24/02
455/436

2015/0106166 A1 * 4/2015 Gutierrez, Jr. ....... G06Q 10/063
705/7.39

FOREIGN PATENT DOCUMENTS

| WO | 2011076253 A1 | 6/2011 |
| WO | 2013030429 A1 | 3/2013 |
| WO | 2013044974 A1 | 4/2013 |

* cited by examiner

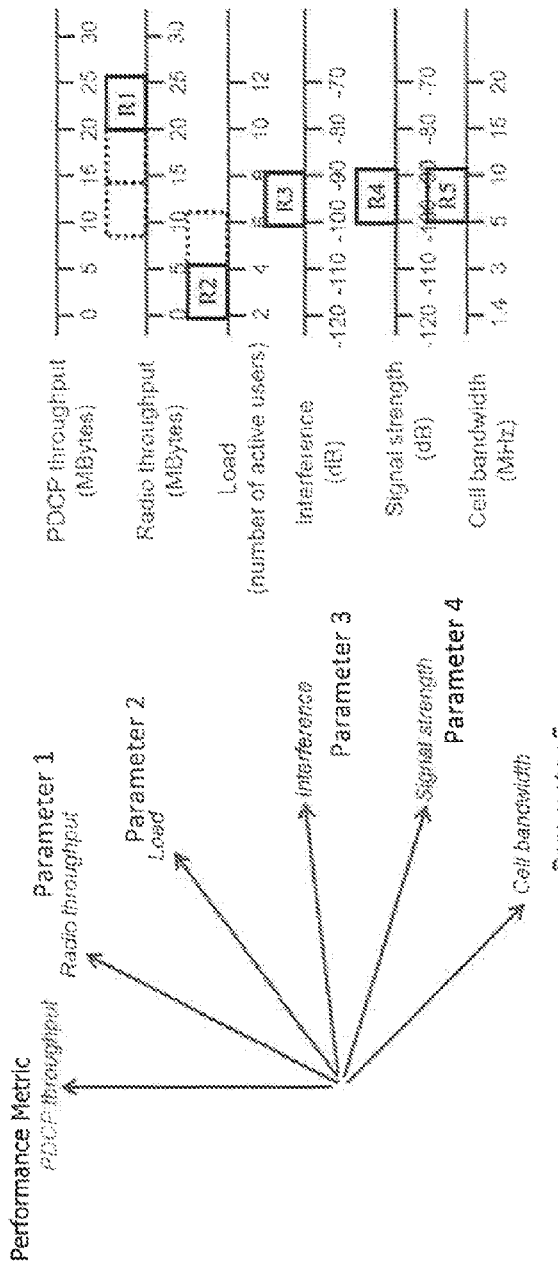

TECHNIQUE FOR PERFORMANCE MANAGEMENT IN A MOBILE COMMUNICATIONS NETWORK

RELATED APPLICATIONS

This application claims priority under 35 U.S.C. §119 from EP application 13005946.2, filed on Dec. 19, 2013.

TECHNICAL FIELD

The present disclosure generally relates to managing performance of a mobile communications network. In particular, the present disclosure relates to generation of performance metric statics and also to performance evaluation. The technique may be embodied in one or more of methods, computer programs, and apparatuses.

BACKGROUND

In a mobile communications network, functions called Network Management System (NMS) or Operations Support System (OSS) are responsible for performance management. Performance is usually measured on the basis of a performance metric, such as Key Performance Indicators (KPIs). The NMS/OSS measures, collects and analyzes KPIs in the network. KPI changes may indicate performance degradation.

When performance degradation occurs, it is necessary for the operator to find out the main cause of the problem (root cause analysis) in order to be able to initiate an appropriate action. Similarly, when the operator would like to increase the level of service provided to its customers, the operator needs to determine the main bottlenecks for achieving higher performance levels and invest in removing those main bottlenecks.

Performance and service quality in mobile communications networks are influenced by a large number of parameters. For example, throughput is influenced by the radio channel quality of a given user terminal but also depends on the number of other active user terminals in the cell, the traffic of those user terminals, Internet side bandwidth, delays and server limitations, just to name a few.

Similarly, a performance degradation seen in the mobile communications network may have a number of reasons. In some cases low performance can immediately be connected to severe network incidents (e.g., cell outage) visible directly from a fault management system. In other cases, however, the decrease in performance cannot be easily explained. For example, there may be no direct connection to any severe network problems or incidents. In particular, there are many parameters in the network that can have direct or indirect impact on performance. These parameters might depend on each other. Thus, usually it is not trivial to find the cause of the performance problems due to the multivariate dependence of the performance on the parameters and the complicated inter-dependence between the parameters.

Any analytical model that targets at characterizing the dependency of a performance metric on individual parameters in a mathematical way based on theoretical knowledge inherently suffers from inaccuracy (i.e., not matching with situations in real networks) and incompleteness (i.e., can take into account only a limited set of parameters). As another example, there is often a complex inter-dependency between the parameters (parameter inter-dependency problem). In other cases, there may be insufficient number of measurements in the network equipment to investigate. Also, different parameters have different units that cannot be properly combined. Still further, numeric and nominal parameters need to be handled in the same framework, which is not a trivial task.

Consequently, in order for a network operator to understand the bottleneck parameters that limit a desired level of a given performance metric (e.g., throughput) in the network, or to identify the root cause of a problem, there is need for mechanisms that can automatically derive this information without relying on any analytical and theoretical modeling.

Several solutions for the problem of root cause analysis in mobile communications networks have been proposed. WO 2013/044974 A1 teaches a root cause analysis technique for performance management according to which performance measurements are associated with identifiers, and the network topology is linked with the measurements through the identifiers. WO 2011/045736 A1 teaches a root cause analysis technique in which it is quantified (based on measurements for each parameter) how much a parameter influences the performance. The quantification includes a factor scoring system and database, which has the advantage of having the same unit for all parameters.

Document EP 2 584 814 A1 may be construed to disclose a method for tracking an International Mobile Equipment Identity (IMEI) of User Equipment (UE), which includes: obtaining, by a Radio Network Controller (RNC), an IMEI of UE from an identity response message, which is sent by the UE to respond a non-access stratum identity request message, after success of signalling connection of a UE call when the RNC establishes Radio Resource Control (RRC) connection with the UE; and saving, by the RNC, the obtained IMEI in a user log generated in a process of the UE call. It is further disclosed an RNC for tracking an IMEI of UE.

Document WO 2011/076253 A1 may be construed to disclose a method by which a network element in a telecommunications network can report factors that have limited the performance of a UE in an observation period. A bottleneck score is calculated for each factor, the bottleneck score providing a measurement of the extent to which that factor has limited the performance of that UE compared to other factors in the observation period. A data record for the UE is populated with the bottleneck scores and sent in a report towards upper layer management functions. When these reports are received (e.g. by a MME) they may be complemented with global entities of the users and aggregated measures created. The bottleneck scores may be calculated by collecting per-UE performance counters from a radio scheduler and estimating an actual UE performance from the collected performance counters, replacing one or more of the measured performance counters with a hypothetical value reflecting a particular factor operating ideally, and estimating a theoretical user performance based on the hypothetical value and remaining performance counters, and assigning a bottleneck score for that factor by comparing the estimated actual user performance with the estimated theoretical user performance.

SUMMARY

There still is a need for a performance management technique that avoids one or more of the problems discussed above, or other, related problems.

Among other things, the teachings herein disclose a method and an apparatus according to the independent claims. Developments are set forth in the dependent claims.

According to a first aspect a method of generating statistics for a performance metric of a mobile communications network is provided, wherein the performance metric has a dependency on at least a first parameter and a second parameter, wherein each of the first parameter and the second parameter is categorized in two or more non-overlapping sets of parameter values, and wherein different combinations of a first parameter value set and a second parameter value set are defined. The method comprises receiving performance metric values, first parameter values and second parameter values, wherein a particular performance metric value is associated with the first and second parameters values prevailing when the particular performance metric value was acquired. The method further comprises identifying groups of performance metric values for which the associated first and second parameter values match the first and second parameter value sets of an individual combination. Still further, the method comprises generating the performance metric statistics from the identified groups of performance metric values.

The individual parameter value sets and parameter value set combinations may each be defined by bins. A particular parameter value set may be given by a range of continuous or discontinuous numerical values. The range may be open on one side. Ranges given for the same parameter may be equidistant or not. In another variant, a particular parameter value set is defined by a non-numerical value, for example an operating system type or a terminal type associated with a particular mobile terminal.

The method may also comprise acquiring the performance metric values and the first and second parameter values. The acquisition may be performed by measurements, registry lookups, or otherwise. In particular the performance metric values may be measured. The acquisitions may be performed by the same network component (e.g., network node) that also performs the methods and method aspects disclosed herein, or by another network component.

A particular performance metric value and the associated first and second parameter values may be acquired such that a dependency of the particular performance metric value on the first and second parameters can be captured. As an example, these values may be measured or derived otherwise substantially at the same point in time and combined in a single data set. As such, the step of receiving the performance metric values, the first parameter values and the second parameter values may comprise receiving multiple such data sets.

The performance metric statistics may generally be indicative of the dependency of the performance metric on the first parameter and the second parameter. Based on the performance metric statistics a performance model may be derived which reflects the dependency of the performance metric statistics on the first parameter and the second parameter in more general terms.

The performance metric statistics may be generated by processing the performance metric values on a group-by-group basis. As an example, the performance metric values of a particular group may be processed, optionally together with a group size metric of the particular group. Generally, the performance metric values may be processed by determining one or more of a distribution, an average, a histogram, a percentile, and a similar measure of the performance metric values of each group.

The method may further comprise determining, for a particular group, a group size metric from a counter indicative of the number of performance metric values constituting the particular group. The group size metric may be indicative of a relative or absolute group size. The relative group size may be determined in relation to a total number of received performance metric values. The absolute group size may be defined by the number of performance metric values in one particular group. The performance metric statistics may also be generated from the group size metric (e.g., by dividing the aggregated performance metric values of one group by the number of performance metric values constituting the group).

The method may also comprise identifying groups of first parameter values for which the first and second parameter values associated with a particular performance metric value match the first and second parameter value sets of an individual combination. In a next step, first parameter statistics may be generated from the identified groups of first parameter values. In a similar manner second and higher order parameter statistics may be generated. The particular parameter statistics may be generated as described herein with respect to the performance metric statistics (e.g., by determining parameter value distributions).

One or more of the performance metric values, the first parameters and the second parameters may have been measured in the mobile communications network (i.e., acquired by a measuring device). At least the performance metric values and the first parameter values may be measured, whereas the second parameter values may be obtained by a registry lookup.

According to a second aspect a method of evaluating performance of a mobile communications network on the basis of a performance metric of the mobile communications network is provided. The performance metric has a dependency on at least a first parameter and a second parameter, wherein each of the first parameter and the second parameter is categorized in two or more sets of non-overlapping parameter values, and wherein different combinations of a first parameter value set and a second parameter value set are defined. The method comprises providing a first distribution of parameter values acquired for the first parameter, a second distribution of parameter values acquired for the second parameter, and basis performance metric statistics, wherein the basis performance metric statistics is derived by applying a performance model to the first distribution and the second distribution. The method further comprises providing a first benchmark distribution for the first parameter and deriving first comparative performance metrics statistics by applying the performance model to the first benchmark distribution and the second distribution. Still further, the method comprises evaluating network performance based on the base performance metric statistics and the first comparative performance metric statistics.

The performance model may be indicative of a dependency of the performance metric on the first parameter and the second parameter. Generally, the performance model may be generated from the performance metric statistics described herein or otherwise.

The method according to the second aspect may also comprise providing a second benchmark distribution for the second parameter, and deriving a second comparative performance metrics statistics by applying the performance model to the second benchmark distribution and the first distribution. The network performance may then additionally be evaluated based on the second comparative performance metrics statistics.

When the performance metric has a dependency from at least one further, third parameter, at least a third distribution of parameter values acquired for the at least one third parameter and at least a third benchmark distribution for the third parameter may be provided, wherein at least one third comparative performance metrics statistics may be derived by applying the performance model to the third benchmark distribution, the first distribution and the second distribution, and wherein the network performance may be additionally evaluated based on the at least one third comparative performance metrics statistics.

Evaluating the network performance may comprise determining the comparative performance metric statistics that provides the highest performance gain relative to the base performance metric statistics. A network bottleneck may then be determined on the basis of the parameter associated with the comparative performance metric statistics providing the highest performance gain.

There may be provided a computer program product comprising program code portions for performing the steps of any of the methods described herein. The computer program product may be stored on a computer-readable recording medium (e.g., a CD-ROM, DVD or semiconductor memory), or may be provided for download via a computer network (e.g., the Internet or a proprietary network).

Also provided is an apparatus for generating statistics for a performance metric of a mobile communications network, the performance metric having a dependency on at least a first parameter and a second parameter, wherein each of the first parameter and the second parameter is categorized in two or more non-overlapping sets of parameter values, and wherein different combinations of a first parameter value set and a second parameter value set are defined. The apparatus comprises an interface adapted to receive performance metric values, first parameter values and second parameter values, wherein a particular performance metric value is associated with the first and second parameters values prevailing when the particular performance metric value was acquired. The apparatus further comprises an identifier adapted to identify groups of performance metric values for which the associated first and second parameter values match the first and second parameter value sets of an individual combination, and a generator adapted to generate the performance metric statistics from the identified groups of performance metric values.

Still further, an apparatus for evaluating performance of a mobile communications network on the basis of a performance metric of the mobile communications network is provided. The performance metric has a dependency on at least a first parameter and a second parameter, wherein each of the first parameter and the second parameter is categorized in two or more sets of non-overlapping parameter values, and wherein different combinations of a first parameter value set and a second parameter value set are defined. The apparatus comprises a provider adapted to provide a first distribution of parameter values acquired for the first parameter, a second distribution of parameter values acquired for the second parameter, and basis performance metric statistics, wherein the basis performance metric statistics is derived by applying a performance model to the first distribution and the second distribution, the provider being further adapted to provide a first benchmark distribution for the first parameter. The apparatus also comprises a deriver adapted to derive first comparative performance metrics statistics by applying the performance model to the first benchmark distribution and the second distribution, and an evaluator adapted to evaluate network performance based on the base performance metric statistics and the first comparative performance metric statistics.

The apparatuses described herein may be installed on one or more nodes of a network management system or operations support system for the mobile communications network. The mobile communications network may be a cellular or non-cellular network. Moreover, one or more of the apparatuses may be configured to acquire the values of interest, for example by measurements or retrieval from a local or remote registry.

BRIEF DESCRIPTION OF THE DRAWINGS

FIG. 5A shows a dependency of a throughput-oriented performance metric on lower level parameters;

FIG. 5B shows an embodiment of multi-dimensional binning for the throughput-oriented performance metric of FIG. 5A;

FIG. 5C shows a breakdown of the throughput-oriented performance metric of FIG. 5B for an individual parameter;

DETAILED DESCRIPTION

In the following description, for purposes of explanation and not limitation, specific details are set forth (such as particular network functions, processes and signaling steps) in order to provide a thorough understanding of the technique presented herein. It will be apparent to one skilled in the art that the present technique may be practiced in other embodiments that depart from these specific details.

For example, the embodiments will partially be described in the context of Long Term Evolution (LTE) or LTE-Advanced (LTE-A) mobile communications technologies; however, this does not rule out the use of the present technique in connection with additional or alternative technologies such as the Global System for Mobile Communications (GSM). While the following embodiments will partially be described with respect to certain Technical Specifications (TSs) of the Third Generation Partnership Project (3GPP), it will be appreciated that the present disclosure could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

With the development of new technologies in mobile communications networks, Operation and Management (O&M) of said technologies has to meet new challenges. The increasing complexity of the successive generations of mobile systems requires more detailed O&M functionality. As an example, in legacy Radio Access Network (RAN) Management Systems (MSs), such as for GSM, the MSs have limited O&M functionality and provide only low resolution data, whereas in LTE, for the RAN MSs, a large number of various high resolution data are provided in order to log events, keep track of operation status and localize potential problems.

Figure 1:
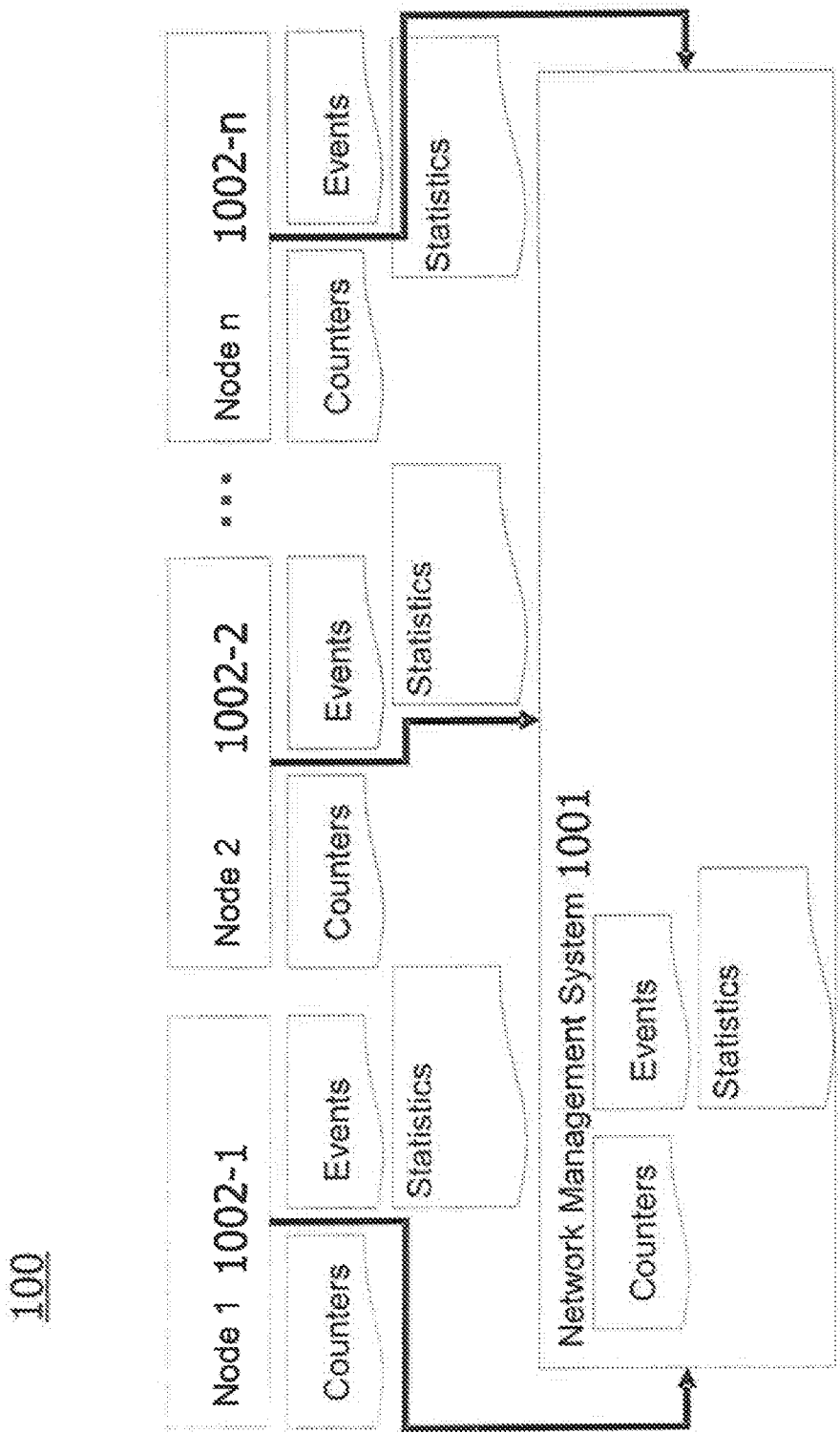
FIG. 1 shows an embodiment of a network management solution for a mobile communications network.

FIG. 1 illustrates a mobile communications network 100 in which the Performance Management (PM) technique presented herein can be implemented. The mobile communications network 100 in one embodiment substantially conforms to 3GPP TS 32.401 V11.0.0 (see, e.g., Section 4 and others). 3GPP provides particular performance measurement definitions, e.g., for GSM and later mobile communications networks. According to 3GPP, the generation of the performance measurement results may be performed either by aggregating and calculating statistical information of events or by exposing internal variables. The performance measurement types can be classified into categories as defined, e.g., in TS 32.401 V11.0.0 (Section 4.2.2).

In the following description of the mobile communications network 100, 3GPP terminology will be used. It will be appreciated that this terminology is not intended to limit the following description and the present disclosure as a whole to any specific communications standard.

As shown in FIG. 1, the mobile communications network 100 comprises a Network Management System (NMS) 1001 and network nodes 1002-1, 1002-2, . . . , 1002-n (e.g., Network Elements, NEs) attached thereto. The nodes 1002-1, 1002-2, . . . , 1002-n are not restricted to one node type or one domain. Rather, they can be multiple node types from multiple domains of the mobile communications network 100 (e.g., an evolved NodeB (eNB) from RAN, a Multimedia Management Entity (MME), a Serving Gateway (S-GW) of the Core Network (CN), etc.). The nodes may be realized as or co-located with Deep Packet Inspection (DPI) probe modules listening on standard interfaces between the network nodes 1002-1, 1002-2, . . . , 1002-n.

Each of the nodes 1002-1, 1002-2, . . . , 1002-n is configured for performance measurements for use in connection with the present disclosure. The measurement results, sometimes also referred to as events herein, may be one or more of logged, counted via counters, and reported to the NMS 1001. Events may contain low-level, high-granularity information obtained from the nodes 1002-1, 1002-2, . . . , 1002-n. Example fields (sometimes also referred to as "parameters") in an event record from the event log may be a timestamp, user ID, cell/node ID, event-related parameters, result codes, etc.

The measurements performed by the nodes 1002-1, 1002-2, . . . , 1002-n are reported to the NMS 1001. There are basically two types of measurement reporting, one resides in (typically periodic) reports of counters, and the other one is event reporting. The NMS 1001 may aggregate the received reports. The NMS 1001 may additionally, or as an alternative, perform logging and counting on its own, for example by probing the nodes 1002-1, 1002-2, . . . , 1002-n.

Performance management by the NMS 1001 (or by an Operation Support System, OSS, not shown in FIG. 1) provides tools for generating long-term statistics, time-series analysis and trend analysis. This may be achieved by regularly collecting counters reported by the nodes 1002-1, 1002-2, . . . , 1002-n at the end of a pre-defined granularity period, also called Result Output Period (ROP), with a typical length of 15 minutes. The counters regularly collected in ROPs on a minute timescale provide a possibility to generate long-term statistics for the measured parameters separately. Performance management may also be based on more detailed measurement logs such as event logs to keep track of the operations on a finer timescale (such as seconds, milliseconds). The event logs can be used for troubleshooting and more detailed analysis. It is also possible to collect event logs from various sources (e.g., from the multiple nodes 1002-1, 1002-2, . . . , 1002-n) in the network and combine (e.g., correlate) them, thus providing an end-to-end (E2E) PM functionality (such as an E2E fault localization).

The events, such as KPIs, collected from the different nodes 1002-1, 1002-2, . . . , 1002-n depend on a large number of parameters. This enables an operator to determine dependencies KPIs and other network parameters, and further facilitates root cause analysis of performance degradation. It should be noted an individual KPI may have a double-role in that it may constitute in some cases a performance metric itself and a parameter for another performance metric in other cases.

It has been found that the existing performance measurement and reporting strategies, such as periodic reports and event logging, do not always satisfy O&M needs. For example, periodic reports in certain implementations hide the details of performance problems, while event logging is cumbersome in terms of storage and processing resources when performed over an extended period of time (e.g., months or years). Moreover, any analytical model that tries to characterize the parameter-dependency of a performance metric in a mathematical way based on theoretical knowledge inherently suffers from inaccuracy (i.e., not matching with situations in real networks) and incompleteness (i.e., can take into account only a limited set of parameters and unable to consider hidden relations between parameters). Moreover, there are parameters, typically non-numerical parameters such as (e.g., terminal type), that are difficult or even impossible to consider in a formalized mathematical way.

One solution presented by the embodiments of this disclosure is a statistics framework in which sets of associated performance metric values and prevailing values of multiple parameters are substantially collected at the same time by at least one of the NMS 1001 and the nodes 1002-1, 1002-2, . . . , 1002-n (see FIG. 1). In one realization, a data aggregation is provided, wherein the amount of data is reduced compared to detailed event logs but dependencies between the performance metric and the parameters are still preserved. The preserved dependencies can be exploited for generating performance metric statistics that may again be used for modeling purposes. The modeling, in turn, can be exploited for root cause analysis (e.g., to determine performance bottlenecks).

The performance model can be used for root cause analysis and to identify main bottlenecks for performance problems in an NMS/OSS layer in mobile communications networks. A performance model for each individual performance metric is created such that the dependency of the performance metric on the set of parameters is captured by the model. The model is in one variant continuously built and updated based on network measurements. The model is in one variant essentially a multi-dimensional distribution of the measured performance metric values in the dimensions of its parameters. When sufficient number of measurements are collected (potentially also from different networks), the whole multi-dimensional space can be scanned.

Another solution presented by embodiments of the present disclosure is related to using the performance model for bottleneck identification and root cause analysis. In order to identify the main bottleneck in a particular cell or in a user connection, the measurement samples of that cell or connection are placed in a multi-dimensional space to establish a dependency model that permits an analysis as to parameter dimension should be improved in order to achieve the largest improvement in the target performance metric of that cell or that user connection.

Figure 2:
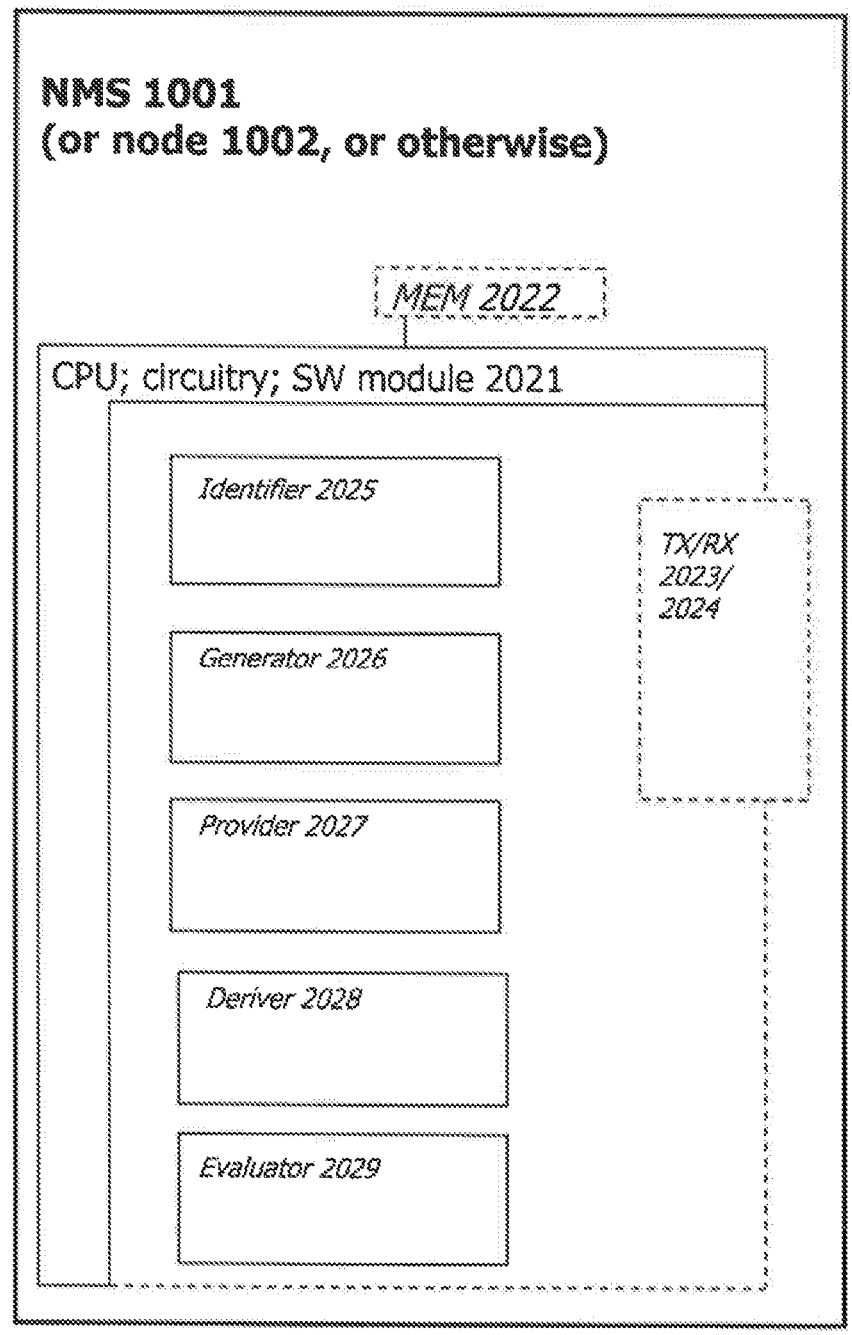
FIG. 2 shows an apparatus embodiment.

FIG. 2 shows components comprised in an exemplary device embodiment realized in the form of the NMS 1001, node 1002-1, 1002-2, . . . , 1002-n, or otherwise (e.g., on any other network node or distributed over several network nodes). For the sake of an easier explanation, the following description of FIG. 2 will exemplarily focus on the NMS 1001.

As shown in FIG. 2, the NMS 1001 comprises a core functionality (e.g., one or more of a Central Processing Unit (CPU), dedicated circuitry and/or a software module) 2021, an optional memory (and/or database) 2022, an optional transmitter 2023 and an optional receiver 2024. It is to be noted that the transmitter 2023 and the receiver 2024 may be provided as an integral transceiver, as indicated in FIG. 2. Moreover, the NMS 1001 comprises an identifier 2025, a generator 2026, a provider 2027, a deriver 2028 and an evaluator 2029. It should be noted that in some variants only the identifier 2025 and the generator 2026 may be implemented in the NMS 1001, in others only the provider 2027, the deriver 2028 and the evaluator 2029 may be implemented.

As partly indicated by the dashed extensions of the functional block of the CPU 2021, the components 2023 to 2029 may at least partially be functionalities running on the CPU 2021, or may alternatively be separate functional entities or means controlled by the CPU 2021 and supplying the same with information. The transmitter and receiver 2023, 2024 may be realized to comprise suitable hardware and/or software interfaces. The CPU 2021 may be configured, for example, using software residing in the memory 2022, to process various data inputs and to control the functions of the components 2023 to 2029. The memory 2022 may serve for storing program code for carrying out the methods according to the aspects disclosed herein, when executed by the CPU 2021.

Figure 3:
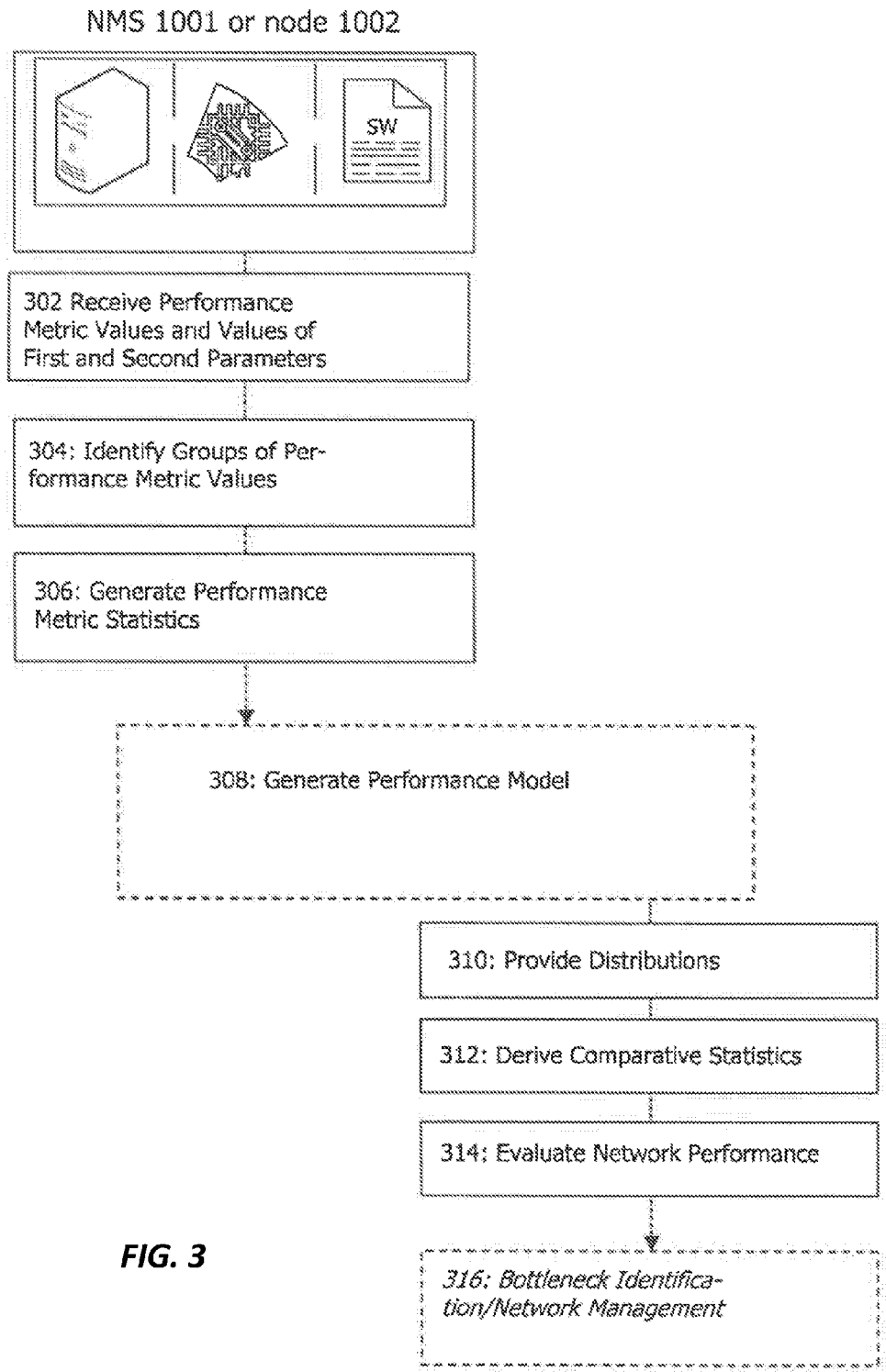
FIG. 3 shows a method embodiment.

FIG. 3 shows a method embodiment which also reflects the interaction between the components of the device embodiment illustrated in FIG. 2. In the signaling diagram of FIG. 3, time aspects between signaling are reflected in the vertical arrangement of the signaling sequence as well as in the sequence numbers. It is to be noted that the time aspects indicated in FIG. 3 do not necessarily restrict any of the method steps shown to the step sequence outlined in FIG. 3. This applies in particular to method steps that are functionally disjunctive with each other.

The method of FIG. 3 provides statistics for a performance metric of the mobile communications 100. The performance metric has a dependency on at least a first parameter and a second parameter. Each of the first parameter and the second parameter has been categorized in two or more non-overlapping sets (e.g., ranges or non-numerical classes) of parameter values. As an example, the first parameter may be categorized in M sets, and the second parameter may be categorized in N sets. Different combinations (or mappings) of a first parameter value set and a second parameter value set are defined. In the exemplary case of M sets for the first parameter values and N sets for the second parameter value, up to M×N different combinations may be defined.

The method comprises in step 302 receiving performance metric values, first parameter values and second parameter values. The values may be received in individual data sets in which a particular performance metric value is associated with the first and second parameters values prevailing when the particular performance metric value was acquired. As such, a dependency of a particular performance metric value from the parameter values may be preserved in a particular data set. The data sets may, for example, be received via an interface integrated in the receiver 2024 from event logs of the network nodes 1002-1, 1002-2, . . . , 1002-n.

The method further comprises in step 304 identifying groups of performance metric values for which the associated first and second parameter values match the first and second parameter value sets of an individual combination. In a first subset, and for each individual parameter value, the particular parameter value set to which the parameter value belongs may be identified. Once the associated first and second parameter value sets have thus been determined, the corresponding combination can be identified. Step 304 can be performed by the identifier 2025 of FIG. 2.

Still further, the method comprises in step 306 generating the performance metric statistics from the identified groups of performance metric values. Step 306 may comprise a group-wise processing of the individual performance metric values so as to derive a distribution of performance metric values for an individual group, or any other statistics measure. The performance metric statistics of an individual group may have been generated taking into account a group size metric. Step 306 can be performed by the generator 2026 of FIG. 2.

In an optional step 308, a performance model is generated from the performance metric statistics. The performance model may be generated to reflect a dependency of the performance metric from the first and second parameters. As an example, the performance model may describe a dependency of the performance metric from distributions of the first and second parameters. The performance model may itself be indicative of a distribution of the performance metric. As such, there may be provided functions or components for calculating distributions and model generation (not shown in FIG. 2).

The method then comprises in step 310 providing a first distribution of parameter values acquired for the first parameter, a second distribution of parameter values acquired for the second parameter, and basis performance metric statistics. The basis performance metric statistics is derived by applying the performance model generated in step 308 (or generated otherwise) to the first distribution and the second distribution. Step 310 further comprises providing a first benchmark distribution for the first parameter. Step 310 may be performed by the provider 2027 in FIG. 2.

The method may also comprise in step 312 deriving first comparative performance metrics statistics by applying the performance model to the first benchmark distribution and the second distribution. Step 312 may be performed by the deriver 2028 in FIG. 2.

Still further, the method comprises in step 314 evaluating network performance based on the base performance metric statistics and the first comparative performance metric statistics. Step 314 may be performed by the evaluator 2029 in FIG. 2.

Step 314 may be performed in various ways. For example, when a second benchmark distribution for the second parameter is provided, a second comparative performance metrics statistics can be derived by applying the performance model to the second benchmark distribution and the first distribution. In such a case step 314 may comprise determining the comparative performance metric statistics that provides the highest performance gain relative to the base performance metric statistics. If, for example, the first comparative performance metric statistics is determined to be associated with the highest performance gain, the first parameter can be identified in an optional step 316 to constitute a higher performance bottleneck in the mobile communication network 100 than the second parameter. As such, in step 316 a corresponding performance management action pertaining to the first parameter can be initiated.

In the following, more detailed embodiments pertaining to the generation of performance metric statistics and performance models on the one hand and the evaluation of network performance on the other hand will be discussed. Those more detailed embodiments may be implemented in connection with the more general embodiments discussed above. For example, the following embodiments may be practiced in the network solution illustrated in FIG. 1.

Generation of Performance Metric Statistics and Performance Models

In one embodiment, generation of a performance model for the performance metric of interest (also called target performance metric hereinafter) comprises the following process:

- Select the target performance metric and the set of parameters, i.e., dimensions, which influence the target performance metric and would thus need to be acquired (e.g., measured). For example, if the target performance metric is throughput, then the parameters can be channel quality, cell load, terminal type, etc.
- Create (e.g., equally distributed) bins where the acquired samples can be placed. The bins are created by dividing each parameter dimension into multiple, non-overlapping (i.e., disjunctive) categories, such as value ranges.
- Perform value acquisition and place each acquired sample in the associated one of the multi-dimensional bins. Each sample (e.g., in the form of a data set) may comprise a performance metric value and the prevailing parameter values. Calculate performance metric statistics for the target performance metric (e.g., the average) from the acquired samples in each bin.
- Generate performance model from the calculated performance metric statistics.

It should be noted that the first two steps could be performed "offline" and based on expert knowledge. The third and fourth steps are then performed automatically to derive statistics for the target performance metric of interest.

Figures 4A, 4B:
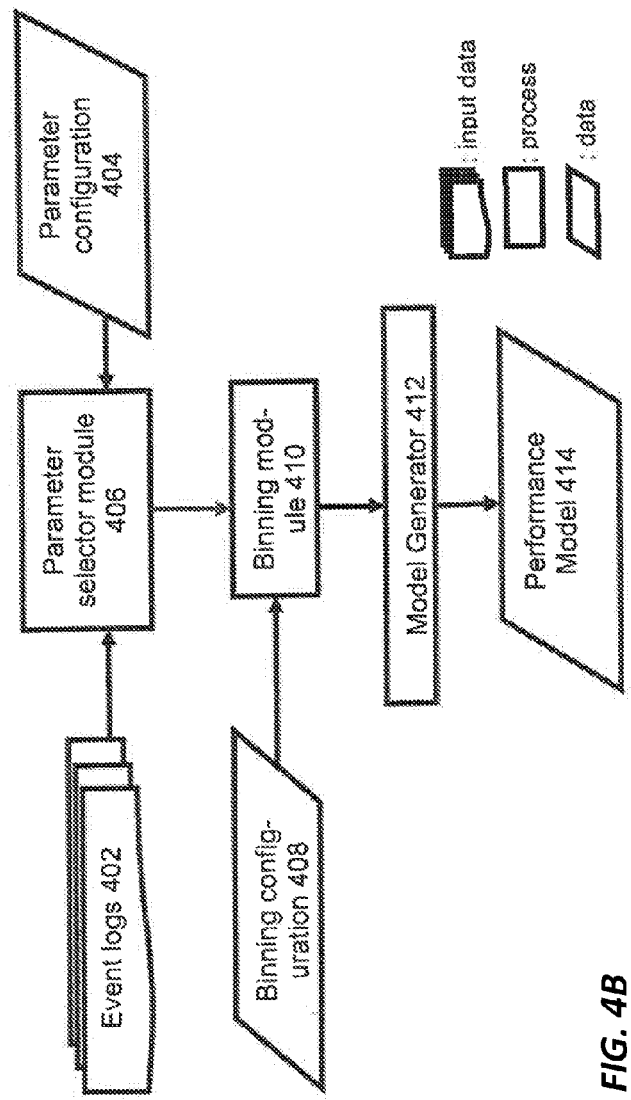
FIG. 4A shows an embodiment of a data structure for multi-dimensional binning of performance metric values and parameter values.
FIG. 4B shows an exemplary binning embodiment.

The resulting multi-dimensional bins from the above process may have a generic data structure format as exemplarily illustrated in FIG. 4A. The dimensions ($p\_1$, $p\_2$, $p\_3$, ...) represent the parameter space on which the target performance metric value depends (e.g., radio quality, cell load, ... in case the target performance metric is throughput). In each dimension the parameter space is divided into a number of categories, or bins (e.g., in $p\_1$, there are bins $p\_11$, $p\_12$, ... $p\_1M$, similarly, in $p\_2$ there are bins $p\_21$, $p\_22$, ... $p\_2N$, etc.). Then, in the multi-dimensional space we have combined bin1, which corresponds to the bin combination of ($p\_11$, $p\_21$, $p\_31$, ...) in the single dimensions.

In FIG. 4A, for each combined bin (e.g., bin1) a metric called samples ratio (e.g., n1) is defined that indicates how many of the samples aggregated in the data structure of FIG. 4A actually fall in a particular combined bin. This metric may generally be based on (i.e., derived from) a counter. In the present case the metric thus indicates the size of a sample group that has been placed in the particular combined bin. This "group size metric" may be indicated in the form of a percentage.

Also, for each combined bin (e.g., bin1) target performance metric statistics are statistically aggregated (e.g., v1). The statistic aggregation may comprise calculating an average or a distribution of all performance metric values placed in the combined bin. It should be noted that also the individual parameter values may be collected in the data structure of FIG. 4A, either in the form of individual values or in a statistically aggregated form (e.g., as an average or distribution).

Samples acquired by measurement or otherwise are collected from the mobile communications network (see, e.g., FIG. 1), where each sample includes one value of the measured target performance metric, e.g., the throughput measured during the last few seconds, and the prevailing parameter values, e.g., radio signal quality, cell load, etc., measured or acquired otherwise substantially at the same time to preserve their inter-dependency. In order to have samples in a format suitable for binning (e.g., different items of information measured at the same time at the same cell, for the same user, etc.), correlation and pre-processing of event logs (e.g., measurement logs) received from the acquisition nodes such as Network Elements (see again FIG. 1) is performed. The different items of information may come from different parts of the network and/or from different information records, etc.

Once the data structure as illustrated in FIG. 4A has been populated with a statistically significant number of samples, a performance model can be derived therefrom as will be explained in greater detail below. Creation of the performance model may include analyzing the collected parameters and the statistically aggregated performance metric values (e.g., the performance metric statistics). Typically, not only the performance metric statistics will enter into the performance model, but also the number of samples (e.g., in terms of the multiple-dimensional parameters distribution).

One embodiment derives performance metric statistics and the performance model from network events (such as compound or correlated events) in event logs as illustrated in FIG. 4B. Based on specific parameter configuration 404 selected offline for a target performance metric a parameter selector module automatically retrieves the samples of interest from distributed event logs 402. The retrieved samples are then binned by a binning module 410. Operation of the binning module 410 is controlled by a binning configuration 408 selected offline. The binning configuration 408 may take the form of a data structure as illustrated in FIG. 4A. The output of the binning module is a data structure onto which the samples have been statistically aggregated to generate the performance metric statistics. A generator 412 finally generates the performance model from the performance metric statistics.

FIG. 5A shows a use case example of performance metrics, the parameters to be selected and associated bins (categories). The exemplary performance metric PDCP throughput depends on parameters such as radio throughput, load, radio signal strength, interference and bandwidth, to name a few. In NMS or OSS solutions, those items of information are logged together with other event parameters in the same data set in an event log (e.g., as shown in FIG. 1). For the purpose of the present example, performance metrics and parameters are regarded to be on the same level. They both may be granulized or otherwise categorized, and an individual multi-dimensional data structure reflecting a particular performance metric statistics may contain a mixture of different parameters on which the performance metric depends. The categorizing, or binning, may be made so that the bins, or parameter value sets, are not too small to get sufficient numbers of samples in the bins. On the other hand, the bin width should not be too large in order to get relevant statistical relations between the parameters and the performance metric.

As a non-limiting example, a single range, or parameter value set, Rx in each parameter is illustrated in FIG. 5. For example, a possible combination of parameter value sets Rx could be defined as follows:

20 to 25 Mbytes radio throughput
2 to 4 active users
−100 to −90 dB interference level
−100 to −90 dB signal strength level
5 to 10 MHz cell bandwidth.

It will be appreciated that in practice multiple parameter value sets will be defined per parameter, so that multiple different value set combinations for different parameters will result.

A simple example for a data structure derived for the exemplary performance metric PDCP throughput illustrated in FIG. 5B. PDCP throughput is measured at Packet Data Convergence Protocol layer in an LTE network, which is very close to the TCP level throughput that any user application would perceive. Therefore, it is for many network operators a relevant target performance metric. Exemplary parameter dimensions in FIG. 5B are radio throughput, cell load and terminal type (see also FIG. 5A). Radio throughput is the "raw" link rate the LTE User Equipment (UE) can see when scheduled, i.e., it is highly dependent on the radio quality of the connection (it can be expressed in terms of bps/Hz, also called spectral efficiency of the link).

The PDCP throughput, i.e., what the UE ultimately receives, directly depends on radio throughput and cell load. When the UE has a very good channel (i.e., high radio throughput) but there is a high congestion in the cell, it will receive a low PDCP throughput (due to the fact that it can be scheduled only less frequently in a congested cell). In another case when the UE may have a poor radio link (low radio throughput) but no congestion in the cell, it can be scheduled frequently but due to poor link quality it will at the end receive low PDCP throughput again. There can be, of course, all kinds of mixed cases as well, and the terminal type may be considered in addition here.

With the help of the target performance metric statistics derived based on the data structure of FIG. 5B it is possible to judge in a particular situation to what extent each factor limits the PDCP throughput. The performance metric statistics can be further elaborated to deeper levels, e.g., such that the radio throughput further depends on signal strength and interference, etc., see FIG. 5C.

Figure 6A:
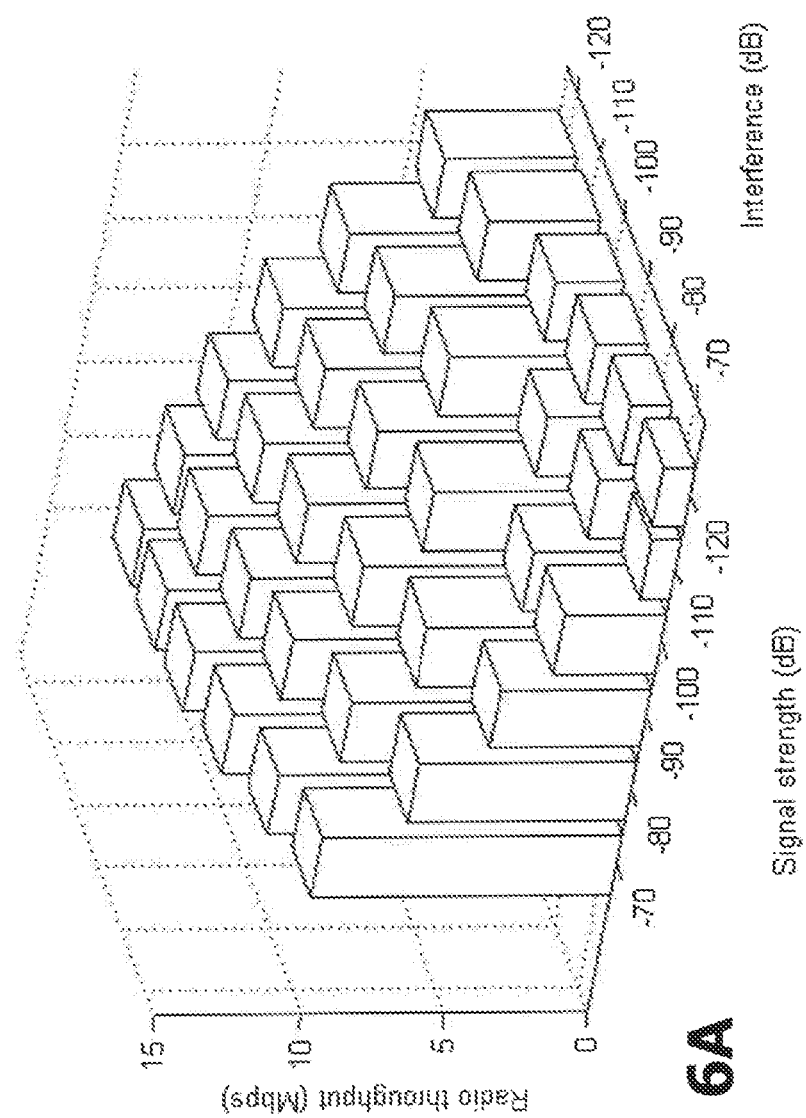
FIG. 6A shows a first example of a performance model expressed as average performance metric values of individual bins.
Figure 6B:
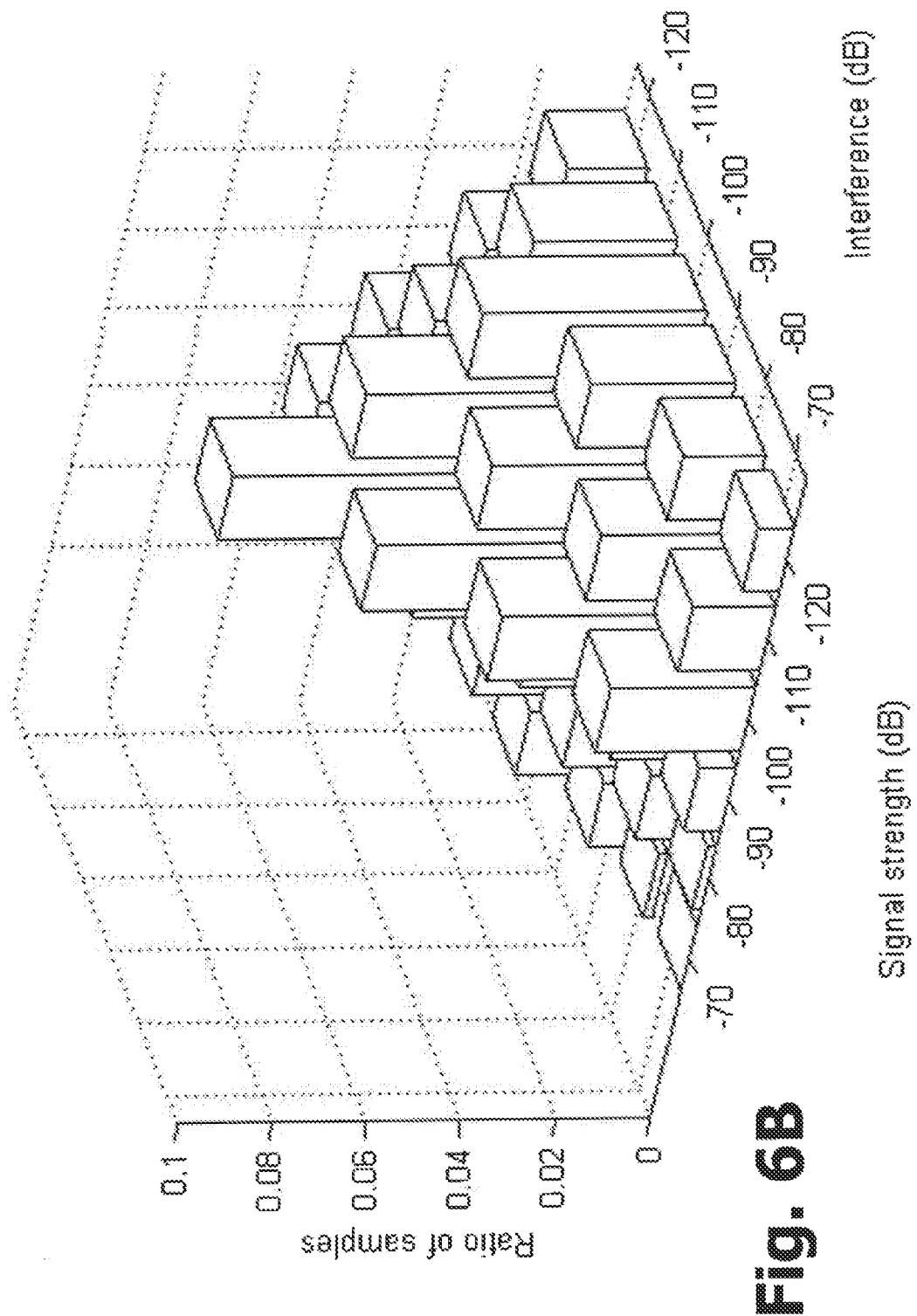
FIG. 6B shows a second example of a performance model expressed as a multi-dimensional distribution of bins.

An example of the multi-dimensional distribution of radio throughput versus signal strength and interference is shown in FIG. 6A. The distribution of samples (i.e., samples ratio) for the same model is illustrated in FIG. 6B.

Figure 7:
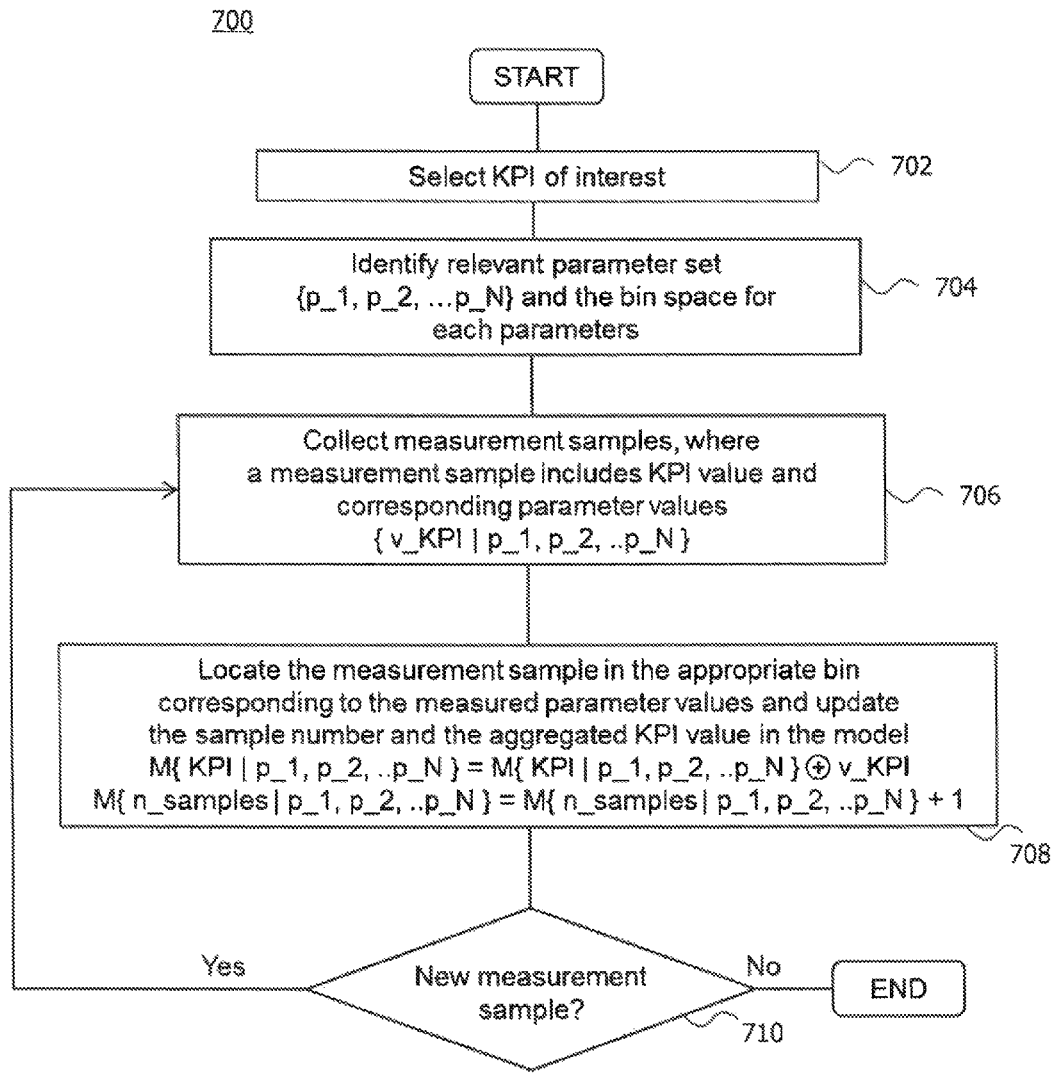
FIG. 7 shows a flow chart of another method embodiment in connection with generating performance metric statistics.

A flowchart 700 of an exemplary model creation approach is illustrated in FIG. 7. In the following, a Key Performance Indicator (KPI) will be regarded as an exemplary target performance metric.

After selecting the target KPI in step 702, the relevant parameter set has to be identified in step 704 on which the KPI depends. As said, step 704 may require expert knowledge to derive the direct or indirect dependencies between the selected KPI and relevant parameters and categorize the parameters properly (see, e.g., FIG. 4B in this regard).

In a next step 706, measurement samples are collected and correlated in a single data set in order to link a measured target KPI value to the prevailing parameter values.

Then, in step 708, for each data set the corresponding bin combination is determined and both the associated KPI value and the number of samples counter is updated (see, e.g., FIG. 4A in this regard). The target KPI values may be statistically aggregated using an arbitrary statistical aggregation function (denoted by circled + sign in FIG. 708) to arrive at the desired KPI statistics. This function can be, for instance, the distribution, the histogram, some percentiles or the average of the KPI values.

After processing a statistically sufficient number of measurement samples, the model creation is finished in steps 710. Otherwise the method loops back to step 706.

Formally, the model is defined as the function M, which gives the desired statistics of the target KPI, such as the average value of the KPI, for each given parameter value combination. That is, $M\{KPI|p\_1, p\_2, \ldots p\_N\}$.

The model can be used to obtain the probability distribution function of the target KPI for given distribution of the input parameters ($F\_p1(x)$, $F\_p2(x)$, ... ). That is, the probability of $P\{KPI<T|F\_p1(x), F\_p2(x), \ldots\}$ is obtained by summing up the probability of those parameter combination values ($v1, v2, v3, \ldots$) for which $M\{KPI|v\_1, v\_2, \ldots, v\_N\}<T$. The probability of a parameter combination is obtained from the distribution functions of the input parameters. For simplicity, the average value of the KPI is often used as the metric of interest, instead of the distribution of the KPI. The average value of the KPI is obtained as $Avg\_kpi=E\{M\{KPI\}|F\_p1(x), F\_p2(x), \ldots\}$.

Using the Model for Bottleneck Identification and RCA

Figure 8:
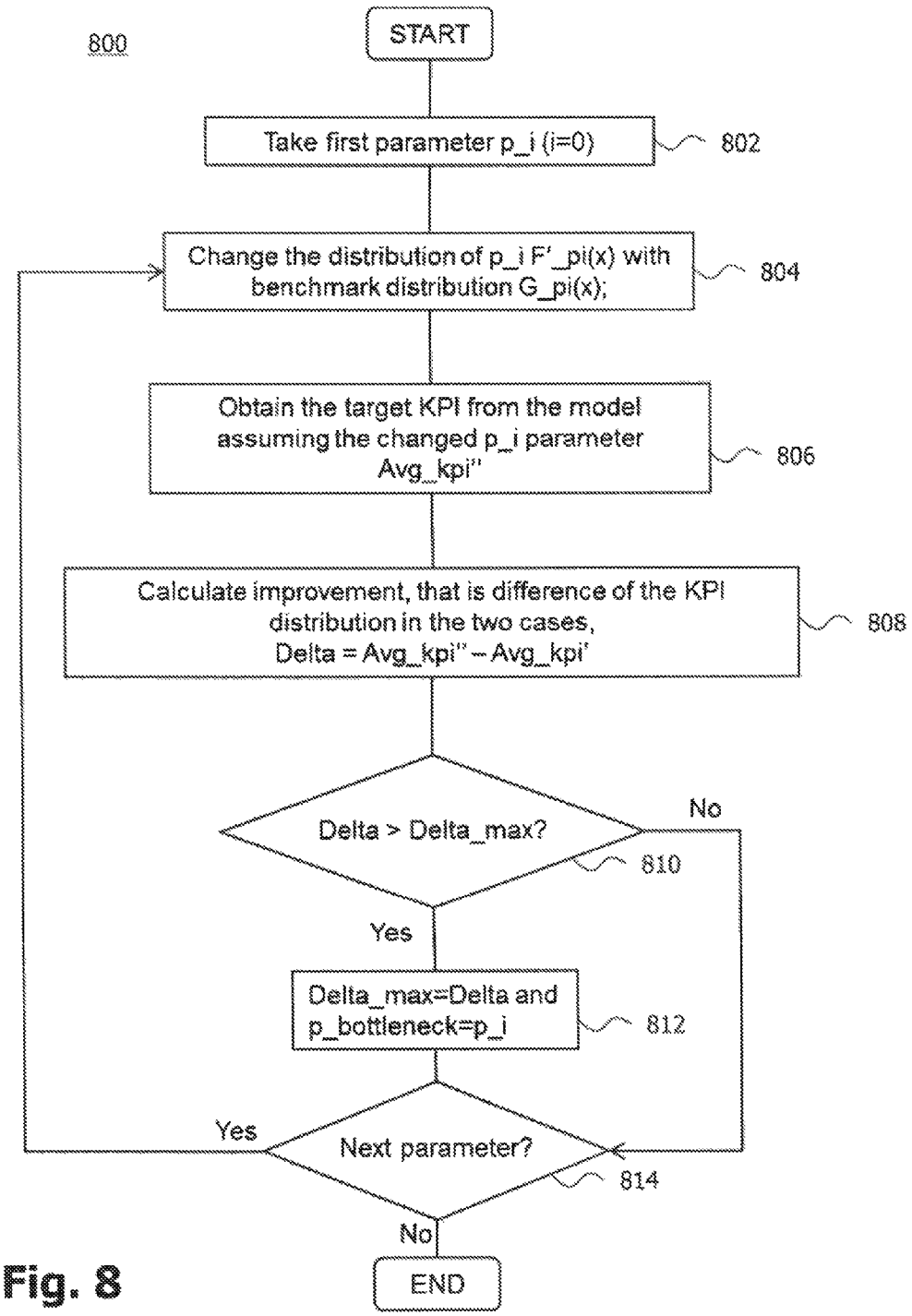
FIG. 8 shows a flow chart of a still further method embodiment in connection with evaluating network performance.

Once the performance model is established from a large set of collected samples (e.g., from the entire network or even from different networks), the model can be used to determine bottlenecks in a particular cell or user connection as illustrated in the flowchart 800 of FIG. 8.

Initially, a distribution of the measured parameters in the investigated cell or user connection is determined, e.g., derived from the data structure of FIG. 4A with the accumulated samples, as $F'\_p1(x), F'\_p2(x), \ldots, F'\_pN(x)$. The average KPI (Avg_kpi') value is calculated given the distribution of parameter values collected in an appropriate data structure.

Starting with step 802, we go through each parameter p_i one-by-one and replace in step 804 the distribution of that parameter with a benchmark distribution (e.g., defined by an operator or generated from other measurements) and evaluate the improvement in the target KPI. That is, we replace the F'_pi(x) distribution of parameter p_i with its benchmark distribution G_pi(x). Then, in step 806, we calculate the new average value of the KPI with the new parameter distribution, using the model, as shown above. That is, $$Avk\_kpi'' = E\{M\{KPI\} | F\_p1(x), G\_pi(x), \ldots \}.$$

In the following steps 808 to 814, we identify the parameter as the main bottleneck, where the improvement in target KPI is the largest once the distribution of that given parameter is replaced with its benchmark distribution:

$$\text{bottleneck\_parameter} = \text{Argmax } \{p\_i | \text{Avg\_kpi''} - \text{Avg\_kpi'}\}.$$

That is, we select the parameter pi where the improvement in the KPI distribution is the highest when replacing the actual marginal distribution of p_i (F'_pi(x)) with that of the benchmark distribution of p_i (G_pi(x)). The benchmark distribution can be the distribution of that parameter in the best performing cell or the distribution of that in the overall network or in best in class network, etc.

Figure 9:
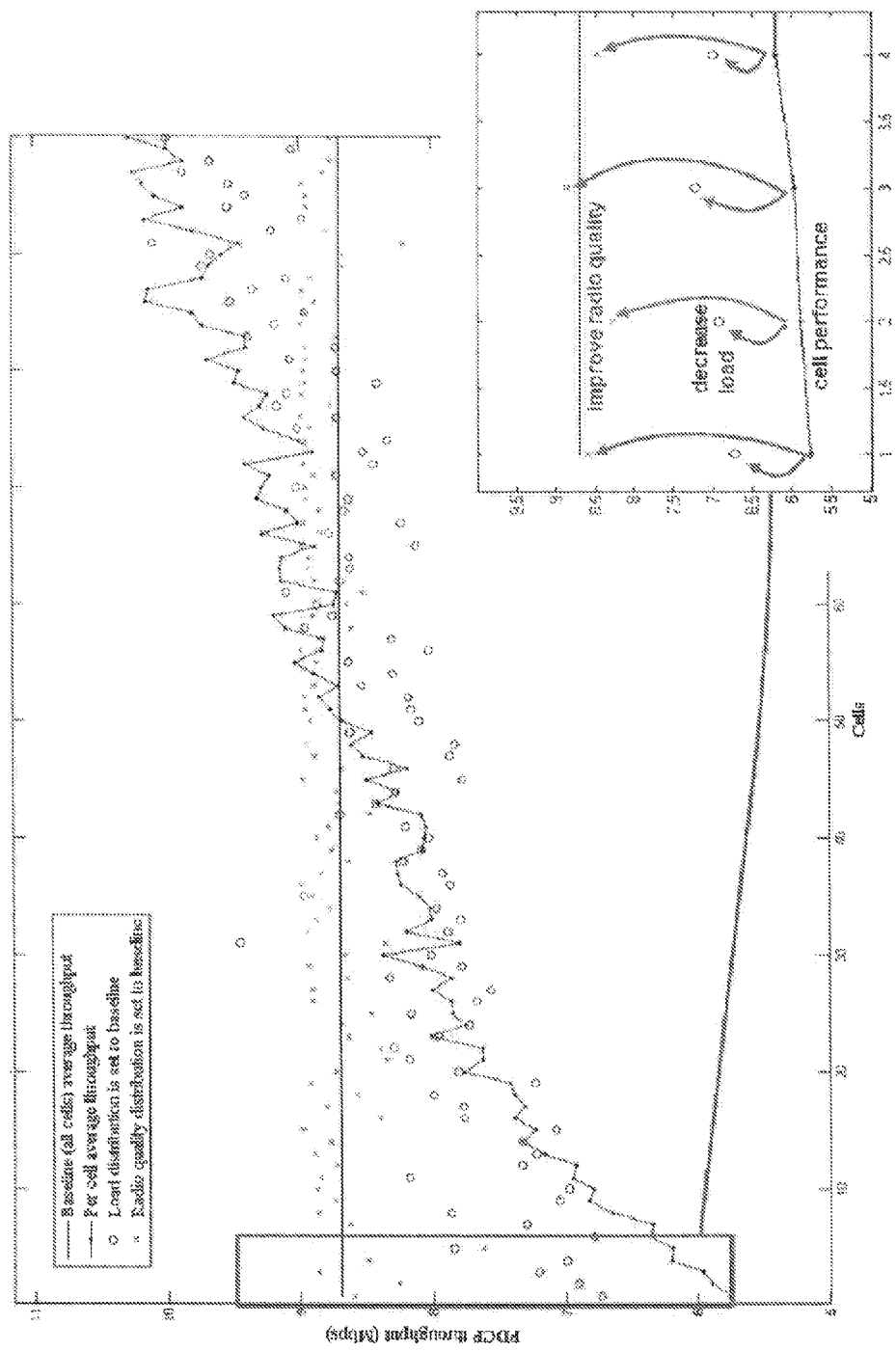
FIG. 9 shows a diagram that illustrates identification of a throughput bottleneck on a cell basis.

An example of the bottleneck identification procedure is illustrated for PDCP throughput bottleneck identification in FIG. 9.

As a first step the performance model is established from actual value acquisitions as discussed in the previous section. As explained above, the PDCP throughput samples may be measured together with the corresponding parameter values (in the present case: radio throughput and cell load) for each cell one-by-one. The cells are plotted in increasing order of measured PDCP throughput values in FIG. 9.

The connected line in FIG. 9 is the actual measured average throughput per cell. The horizontal line shows the overall network average. FIG. 9 also shows two additional points per cell, corresponding to two benchmark cases: (1) the first case is when the cell load distribution of the particular cell is replaced with cell load distribution in the overall network (indicated by "circle" sign) and (2) the second case is when the radio quality (i.e., radio throughput) distribution of the particular cell is replaced with the radio link quality distribution in the overall network (indicated by "cross" sign). In both cases one obtains the expected KPI value (PDCP throughput) of that cell given that we perform the first and second benchmarking (all calculated form the previously established model).

Then, depending on which benchmarking case we get higher expected throughput KPI, we determine whether the load or the radio quality is the bottleneck in that particular cell. In the given example, in the majority of the cells the radio link quality is the main bottleneck and not the load.

With the proposed approach it is possible to learn from acquired samples how a particular target performance metric depends on prevailing parameters (e.g., network conditions). There is no need to assume any theoretical or analytical modeling of performance, as the model is created from what is actually acquired in the network (e.g., measured). One advantage lies in the use of this model to benchmark and compare the expected performance improvements when changing certain conditions. Thereby it becomes possible to identify bottleneck parameters where changing the parameter would provide the highest gain, or to influence parameter optimization decisions in the right direction. High detail level of performance is preserved, since the granularity of the binning (i.e., the categories) is adjustable and the relations and dependencies between the parameters and the performance metric can be derived.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

What is claimed is:

1. A method of generating statistics for a Key Performance Indicator, KPI, of a mobile communications network, the KPI having a dependency on at least a first parameter and a second parameter, wherein each of the first parameter and the second parameter is categorized in two or more non-overlapping sets of parameter values, and wherein different combinations of a first parameter value set and a second parameter value set are defined, the method being performed by one of a Network Management System, NMS, and a network node and comprising:
   receiving KPI values, first parameter values and second parameter values, wherein a particular KPI value is associated with the first and second parameters values prevailing when the particular KPI value was acquired;
   identifying groups of KPI values for which the associated first and second parameter values match the first and second parameter value sets of an individual combination; and
   generating the KPI statistics from the identified groups of KPI values, wherein the KPI statistics are generated by processing the KPI values on a group-by-group basis.

2. The method of claim 1, wherein:
   the KPI statistics are indicative of the dependency of the KPI on the first parameter and the second parameter.

3. The method of claim 1, wherein:
   the KPI values are processed by determining one or more of a distribution, an average, a histogram, and a percentile of the KPI values of each group.

4. The method of claim 1, further comprising:
   determining, for a particular group, a group size metric from a counter indicative of the number of KPI values constituting the particular group.

5. The method of claim 4, wherein:
   the KPI statistics are also generated from the group size metric.

6. The method of claim 1, further comprising:
   identifying groups of first parameter values for which the first and second parameter values associated with a particular KPI value match the first and second parameter value sets of an individual combination;
   generating first parameter statistics from the identified groups of first parameter values.

7. The method of claim 1, wherein:
   one or more of the KPI values, the first parameters value and the second parameter values have been measured in the mobile communications network.

8. The method of claim 1, further comprising evaluating network performance of the mobile communications network from the KPI statistics, comprising:
   obtaining a performance model from the KPI statistics;
   providing a first distribution of parameter values acquired for the first parameter, a second distribution of parameter values acquired for the second parameter, and basis KPI statistics, wherein the basis KPI statistics are derived by applying the performance model to the first distribution and the second distribution;

providing a first benchmark distribution for the first parameter;

deriving first comparative KPIs statistics by applying the performance model to the first benchmark distribution and the second distribution; and evaluating the network performance based on the base KPI statistics and the first comparative KPI statistics.

9. The method of claim 8, wherein:

the performance model is indicative of a dependency of the KPI from the first parameter and the second parameter.

10. The method of claim 8, further comprising:

providing a second benchmark distribution for the second parameter;

deriving a second comparative KPI statistics by applying the performance model to the second benchmark distribution and the first distribution, wherein the network performance is additionally evaluated based on the second comparative KPI statistics.

11. The method of claim 10, wherein:

evaluating the network performance comprises determining the comparative KPI statistics that provides the highest performance gain relative to the base KPI statistics.

12. The method of claim 11, wherein:

evaluating the network performance comprises identifying a network bottleneck on the basis of the parameter associated with the comparative KPI statistics providing the highest performance gain.

13. A non-transitory computer-readable medium storing a computer program comprising program instructions for execution by a processing circuit in a Network Management System, NMS, or a network node, for generating statistics for a Key Performance Indicator, KPI, of a mobile communications network, the KPI having a dependency on at least a first parameter and a second parameter, wherein each of the first parameter and the second parameter is categorized in two or more non-overlapping sets of parameter values, and wherein different combinations of a first parameter value set and a second parameter value set are defined, said computer program instructions comprising program instructions causing the NMS or network node to:

receive KPI values, first parameter values and second parameter values, wherein a particular KPI value is associated with the first and second parameters values prevailing when the particular KPI value was acquired;

identify groups of KPI values for which the associated first and second parameter values match the first and second parameter value sets of an individual combination; and generate the KPI statistics from the identified groups of KPI values, wherein the KPI statistics are generated by processing the KPI values on a group-by-group basis.

14. An apparatus for generating statistics for a Key Performance Indicator, KPI, of a mobile communications network, the KPI having a dependency on at least a first parameter and a second parameter, wherein each of the first parameter and the second parameter is categorized in two or more non-overlapping sets of parameter values, and wherein different combinations of a first parameter value set and a second parameter value set are defined, the apparatus being one of a Network Management System, NMS, and a network node and comprising:

interface circuitry configured to receive KPI values, first parameter values and second parameter values, wherein a particular KPI value is associated with the first and second parameters values prevailing when the particular KPI value was acquired; and processing circuitry configured to:

identify groups of KPI values for which the associated first and second parameter values match the first and second parameter value sets of an individual combination; and generate the KPI statistics from the identified groups of KPI values, wherein the KPI statistics are generated by processing the KPI values on a group-by-group basis.

15. The apparatus of claim 14, wherein the processing circuitry is further configured to evaluate network performance of the mobile communications network from the KPI statistics, based on being configured to:

obtain a performance model from the KPI statistics;

provide a first distribution of parameter values acquired for the first parameter, a second distribution of parameter values acquired for the second parameter, and basis KPI statistics, wherein the basis KPI statistics is derived by applying the performance model to the first distribution and the second distribution;

provide a first benchmark distribution for the first parameter;

derive first comparative KPI statistics by applying the performance model to the first benchmark distribution and the second distribution; and evaluate network performance based on the base KPI statistics and the first comparative KPI statistics.

* * * * *